US012643627B2

(12) United States Patent (10) Patent No.: US 12,643,627 B2
Schraff et al. (45) Date of Patent: Jun. 2, 2026

(54) METHOD FOR THE OPEN-LOOP CONTROL OF A DRIVE DEVICE

(71) Applicant: ZF Friedrichshafen AG, Friedrichshafen (DE)

(72) Inventors: Uwe Schraff, Markdorf (DE); Uwe Griesmeier, Markdorf (DE); Thomas Hodrius, Weiler-Simmerberg (DE); Günter Riess, Eriskirch/Mariabrunn (DE); Michel Wiemer, Weingarten (DE); Alexander Jungaberle, Schlier (DE); Markus Wallner, Friedrichshafen (DE); Manfred Schenk, Friedrichshafen (DE); Peter Seidel, Oberteuringen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 18/642,967

(22) Filed: Apr. 23, 2024

(65) Prior Publication Data

US 2024/0359771 A1 Oct. 31, 2024

(30) Foreign Application Priority Data

Apr. 27, 2023 (DE) .......................... 102023203911.7

(51) Int. Cl.
*B62M 6/50* (2010.01)
*B62J 45/412* (2020.01)
(52) U.S. Cl.
CPC .............. *B62M 6/50* (2013.01); *B62J 45/412* (2020.02)
(58) Field of Classification Search
CPC . B62M 6/50; B62M 6/45; B62J 45/412; B62J 45/413
See application file for complete search history.

(56) References Cited

U.S. PATENT DOCUMENTS 5,865,267 A * 2/1999 Mayer ...................... B62M 6/60
180/220
10,933,944 B2 * 3/2021 Usami .................... B62J 45/411
(Continued)

FOREIGN PATENT DOCUMENTS

WO WO2015/017456 A2 2/2015

OTHER PUBLICATIONS

German Search Report for Application No. 102023203911.7 dated Jan. 19, 2024.
(Continued)

*Primary Examiner* — Richard M Camby
(74) *Attorney, Agent, or Firm* — Dority & Manning, P.A.

(57) ABSTRACT

A method for open-loop control of a drive device for assisting a vehicle at least intermittently operable by muscle power is provided. The vehicle includes a driving wheel drivable by drive force provided from the drive device, and a crank apparatus rotatable by a rider of the vehicle. The method includes: (S1) querying a predetermined operating mode of the drive device specifiable by the rider of the vehicle; (S2) detecting a rotational speed of the driving wheel; (S3) detecting a rotational speed of the crank apparatus; (S4) determining a synchronous operation with respect to the rotational speed of the driving wheel and the rotational speed of the crank apparatus based on a transmission ratio between the crank apparatus and the driving wheel; and (S6) controlling the drive device with a predefined drive power regardless of a muscle power introduced into a crank apparatus when the predetermined operating mode is present and the synchronous operation is present.

12 Claims, 1 Drawing Sheet

(56)                    References Cited

U.S. PATENT DOCUMENTS

2003/0159870 A1*   8/2003   Yu ........................... B60L 50/20
                                                      180/206.2
2010/0181130 A1*   7/2010   Chou ...................... B62M 6/40
                                                      180/206.7
2015/0367750 A1*   12/2015   Takamoto ............. B62K 11/00
                                                      701/22
2017/0129341 A1*   5/2017   Hosaka .................. B60L 50/20
2017/0356816 A1*   12/2017   D'Elia ................. G01L 5/0019
2020/0262512 A1*   8/2020   Hahn .................... B62M 9/122
2023/0104630 A1*   4/2023   Hahn .................... B60L 3/0007
                                                      701/22
2024/0025511 A1*   1/2024   Klieber .................. B60L 50/20
2024/0383564 A1*   11/2024   Jordan .................... B62M 6/50

OTHER PUBLICATIONS

European Search Report for Application No. 24172096.0 dated Sep.
26, 2024.

* cited by examiner

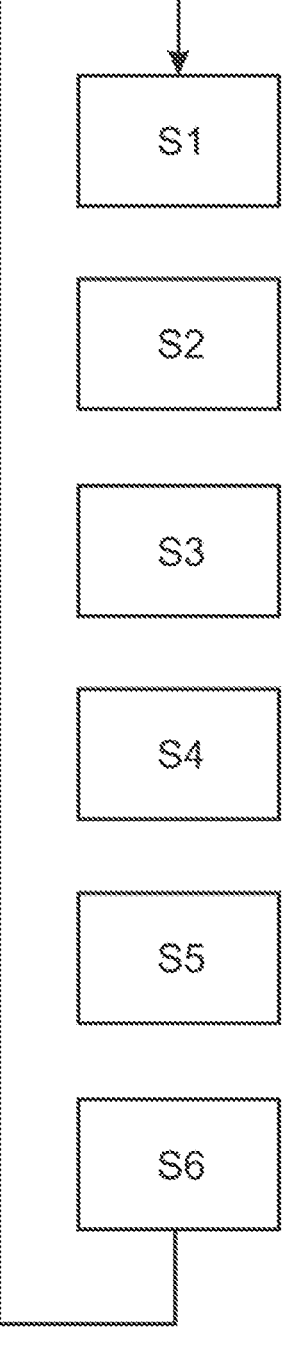

METHOD FOR THE OPEN-LOOP CONTROL OF A DRIVE DEVICE

CROSS-REFERENCE TO RELATED APPLICATION

The present application is related and has right of priority to German Patent Application No. DE102023203911.7 filed in the German Patent Office on Apr. 27, 2023, which is incorporated by reference in its entirety for all purposes.

TECHNICAL FIELD

The present invention relates generally to a method for the open-loop control of a drive device. In particular, the present invention relates generally to a method for the open-loop control of a drive device for assisting a vehicle which is at least intermittently operable by muscle power. The present invention also relates generally to a control device for the open-loop control of a drive device and to a vehicle having a drive device which is equipped with such a control device.

BACKGROUND

Vehicles which are at least intermittently operable by muscle power and have a drive device for assisting the muscle power are known. In particular, such vehicles are in the form of e-bikes, or pedelecs, in which the drive device has an electric motor for assisting the muscle power. Conventionally, such vehicles are controlled by an open-loop system such that the muscle power is detected, for example, in the form of a torque which is introduced into a crank apparatus, and the drive device is controlled by an open-loop system in order to assist the drive on the basis of the detected torque. In such vehicles, it is necessary, in principle, for a certain muscle power to be introduced so that the drive device provides an assisting drive force.

BRIEF SUMMARY

According to a first example aspect, a method for the open-loop control of a drive device for assisting a vehicle which is at least intermittently operable by muscle power is provided, the vehicle having a driving wheel which is drivable by drive force provided by the drive device, and having a crank apparatus which is rotatable by a rider of the vehicle, wherein the method includes the following: querying the presence of a predetermined operating mode of the drive device, which is specifiable by the rider of the vehicle; detecting a rotational speed of the driving wheel; detecting a rotational speed of the crank apparatus; determining a synchronous operation with respect to the rotational speed of the driving wheel and the rotational speed of the crank apparatus on the basis of a transmission ratio between the crank apparatus and the driving wheel; and controlling the drive device with a predefined drive power regardless of a muscle power which is introduced into a crank apparatus, when the predetermined operating mode is present and it is determined that the synchronous operation is present.

The drive device can include an electric machine which, due to the take-up of electrical power, can output mechanical power and apply the mechanical power onto the driving wheel. The vehicle, which is at least intermittently operable by muscle power, can be in the form of a bicycle, in particular as a pedelec, or an e-bike. The vehicle can have two or more wheels. The crank apparatus of the vehicle can be connected to the driving wheel of the vehicle via a transmission mechanism. The transmission mechanism can be a chain, a belt or the like. The crank apparatus can be coupled to the driving wheel with a predetermined transmission ratio. The transmission ratio can be an invariable transmission ratio. Alternatively, the transmission ratio can be variable. When the transmission ratio is variable, the transmission ratio can be variable in a stepped or continuous manner. The transmission ratio can be variable on the basis of a specification provided by the rider of the vehicle. Alternatively or additionally, the transmission ratio can be automatically variable, and a control device for adjusting the transmission ratio can be provided between the crank apparatus and the driving wheel. The transmission ratio between the crank apparatus and the driving wheel can be directly or indirectly provided as information, which can be evaluated for the method.

In the force transmission path between the crank apparatus and the driving wheel, at least one freewheel unit can be provided. The freewheel unit can be designed in such a way that force can be transmitted from the crank apparatus onto the driving wheel in one direction, which is associated with forward travel. When the crank apparatus rotates in a direction counter to the direction of rotation of the crank apparatus, which is associated with the forward direction, decoupling can be provided between the crank apparatus and the driving wheel by the freewheel unit. The drive device can directly or indirectly transmit the drive force onto the driving wheel.

The predetermined operating mode can be specifiable by the rider of the vehicle via an input device. The rotational speed of the driving wheel can be detected by a speed sensor, which can directly or indirectly detect the rotational speed of the driving wheel. The information regarding the rotational speed of the driving wheel can be provided for the method for evaluation. The rotational speed of the crank apparatus can be detected by a sensor, which can directly or indirectly detect the rotational speed of the crank apparatus. The information regarding the rotational speed of the crank apparatus can be provided for the method for evaluation.

The synchronous operation with respect to the rotational speed of the driving wheel and the rotational speed of the crank apparatus on the basis of a transmission ratio between the crank apparatus and the driving wheel is present when the rotational speed of the crank apparatus corresponds to the rotational speed that is present when the vehicle is driven by muscle power. In this case, the information regarding the present transmission ratio can be used to determine the presence of the synchronous operation when the transmission ratio is variable. The synchronous operation is present, for example, when a transmission ratio with respect to the rotational speed of the driving wheel and the rotational speed of the crank apparatus is one to two and the rotational speed of the driving wheel is twice the rotational speed of the crank apparatus.

When the driving device is controlled with a specified drive power regardless of a muscle power which is introduced into the crank apparatus, drive power is also output by the drive device in order to drive the vehicle when the crank apparatus is rotated by the rider but no muscle power or essentially no muscle power is introduced into the crank apparatus.

According to one example embodiment, the drive device is specifically controlled with the specified drive power when the crank apparatus is rotated essentially without force being introduced. In this case, it is permissible that a minor amount of force is introduced into the crank apparatus, which force is necessary, for example, to drive the transmission device between the crank apparatus and the driving wheel. A rotation of the crank apparatus essentially without force being introduced is present when the force introduced into the crank apparatus is very low or negligible in relation to the total drive force of the vehicle.

According to one example embodiment, the presence of the synchronous operation with respect to the rotational speed of the driving wheel and the rotational speed of the crank apparatus can be determined at least when the rotational speed of the crank apparatus corresponds to a synchronous speed which results from the rotational speed of the driving wheel and the transmission ratio between the crank apparatus and the driving wheel. The transmission ratio can be used as known information in order to determine whether the rotational speed of the crank apparatus corresponds to the synchronous speed. The synchronous speed of the crank apparatus is present when the rotational speed of the crank apparatus corresponds to the rotational speed that would set in when the vehicle is driven by the crank apparatus with the present transmission ratio. The presence of the synchronous operation can also be determined when the rotational speed of the crank apparatus is slightly lower than the synchronous speed. In this case, the freewheel unit, which is provided in the force transmission path between the crank apparatus and the driving wheel, disengages, such that no force can be transmitted from the crank apparatus onto the driving wheel.

According to one example embodiment, the presence of the synchronous operation with respect to the rotational speed of the driving wheel and the rotational speed of the crank apparatus can be determined when the rotational speed of the crank apparatus is within a rotational speed range of the synchronous speed up to a limit speed, the limit speed being lower than the synchronous speed. In this example embodiment, it is provided that a minor deviation of the rotational speed of the crank apparatus from the synchronous speed is permissible in order to determine the presence of the synchronous speed.

According to one example embodiment, when the drive device is controlled with a specified drive power, the specified drive power can be a maximum power that can be output or a preset power which is lower than the maximum power that the drive device can output. The electric machine provided in the drive device can output a rated power, which can correspond to a maximum power. The maximum power can be determined such that this power can be output by the drive device for a predetermined period of time without adversely affecting the function of the drive device. When the specified drive power is a preset power which is lower than the maximum power that the drive device can output, the specified drive power can be adjustable to a fixed value or to a variable value. The adjustment of the preset power can be specified by the rider of the vehicle.

According to one example embodiment, when the drive device is controlled with a specified drive power, the specified drive power can be adjusted with a predetermined curve. If the drive device is controlled such that the drive device outputs a specified drive power, for example, the maximum power that can be output, it is advantageous to increase the drive power to the maximum power with a gradient that does not exceed a predetermined value. In this way, excessive slip values at the driving wheel due to high acceleration values can be prevented. The predetermined curve, with which the specified drive power is adjusted, can be a time curve. In particular, the predetermined curve can be represented as a ramp, according to which the drive power is increased with a linear gradient with respect to time. Alternatively, other functional relationships can be used, provided that safety is ensured during operation of the vehicle.

According to one example embodiment, the drive device can be controlled with a specified drive power when the rotational speed of the crank apparatus corresponds to a predetermined minimum rotational speed. The minimum rotational speed is selected such that an inadvertent or unintentional rotation of the crank apparatus will not be taken into consideration for the control of the drive device.

According to one example embodiment, the drive device can be controlled with a specified drive power when the rotation of the crank apparatus is detected at least during a predetermined minimum time period. In this case, the minimum time period is set up such that an inadvertent or unintentional rotation of the crank apparatus for a short period of time will not be taken into consideration for the control of the drive device.

According to another example aspect, a control device for controlling a drive device for assisting a vehicle, which is at least intermittently operable by muscle power, is provided, the control device being provided with an input interface for receiving signals which relate at least to a rotational speed of a driving wheel, a rotational speed of a crank apparatus and a query of the presence of a predetermined operating mode of the vehicle; an output interface for outputting signals for controlling the drive device; and a computer unit for determining a synchronous operation with respect to the rotational speed of the driving wheel and the rotational speed of the crank apparatus, wherein the control device is designed to carry out the method having one or more of the above-defined features. The control device can be a separate unit which is mountable on the vehicle. Alternatively, the control device can be integrated into a control unit for the overall open-loop control of the vehicle.

According to another example aspect, a vehicle is provided, which has a drive device for assisting a drive which is carried out at least intermittently by muscle power, and a control device according to the aforementioned example aspect. The vehicle can be a bicycle having a front wheel and a rear wheel, at least one of the front wheel and the rear wheel being in the form of a driving wheel. The vehicle can also have an electrical energy storage unit, which is coupled to the drive device in order to transmit electrical power. Alternatively, the vehicle can be a multi-track vehicle having one or more driving wheel(s).

With respect to the bicycle, in the force transmission path between the crank apparatus and the driving wheel, a transmission can be provided, which provides a transmission ratio between the crank apparatus and the driving wheel. The transmission can be a stepped transmission which can provide multiple selectable transmission ratios. Alternatively, the transmission can be a continuously variable transmission which can variably provide transmission ratios in a transmission ratio range. With respect to the bicycle, the transmission ratios can be specified manually, electromechanically or in any other way via an input from the rider. Alternatively, the transmission ratios can be automatically specified by a controller which is provided for this purpose. In any case, the information regarding the existing transmission ratios is available for carrying out the example method according to the aforementioned description.

BRIEF DESCRIPTION OF THE DRAWING

FIG. 1 shows a schematic diagram for illustrating the steps which are carried out by the method, according to one example embodiment.

DETAILED DESCRIPTION

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

In the following, an example embodiment of the method is described and, initially, a configuration of an exemplary vehicle which is suitable therefor is explained. The vehicle is not shown in the drawing. In the example embodiment described here, it is assumed that the vehicle is in the form of a pedelec, or an e-bike, which has a front wheel and a rear wheel. The vehicle, which is in the form of a bicycle, is not shown in the FIGURE.

With respect to the bicycle, which is in the form, for example, of a pedelec or an e-bike, the rear wheel is provided as a driving wheel and the front wheel is usually provided as a running wheel, which is steerable and not driven. The bicycle has, in addition to a handlebar, a saddle, a brake unit and further necessary elements, a crank apparatus and a drive device. The drive device in the present example embodiment includes an electric machine, which is coupled to the driving wheel such that the drive power of the electric machine can be transmitted onto the driving wheel. The electric machine is supplied via a circuit with electrical power from an electrical energy accumulator, which is provided on the bicycle.

The crank apparatus can be in the form of a crank having pedals, which can be rotated by the bicycle rider, such that the crank apparatus rotates. The crank apparatus in the present example embodiment is connected via a chain drive to the rear wheel, which is in the form of a driving wheel. In the present example embodiment, a shiftable transmission is provided on a hub of the rear wheel, by which shiftable transmission a transmission ratio between the crank apparatus and the rear wheel can be adjusted in steps in the usual manner. The transmission ratios are selected using an operating unit, which is provided on the handlebar and is actuatable by the bicycle rider.

The bicycle also has a speed sensor for detecting a rotational speed of the crank apparatus. The bicycle also has a speed sensor for detecting a rotational speed of the rear wheel. In addition, a determination unit is provided, which can determine the presently selected transmission ratio between the crank apparatus and the driving wheel and provide the result for the method. The signals, or the information, regarding the rotational speed of the rear wheel, the rotational speed of the crank apparatus and the presently selected transmission ratio between the crank apparatus and the rear wheel are/is supplied to a control device which is provided on the bicycle.

At the rear wheel, according to the present example embodiment, a freewheel unit is provided, which engages when the crank apparatus is rotated for forward travel and disengages when the bicycle rolls while the crank apparatus is not rotated.

At a certain transmission ratio, a corresponding ratio results between the rotational speed of the crank apparatus and the rotational speed of the rear wheel. Thus, for a predetermined transmission ratio, a synchronous operation is achieved between the crank apparatus and the rear wheel at the least when the bicycle is driven by applying muscle power into the crank apparatus. In this state, the freewheel unit on the hub of the rear wheel is engaged. The rotational speed of the crank apparatus, which is then present, is referred to as a synchronous speed of the crank apparatus. For the case in which the rotational speed of the crank apparatus is lower than the synchronous speed, the freewheel unit on the hub of the rear wheel disengages and no force is transmitted from the crank apparatus onto the rear wheel In the following, the method for the open-loop control of the drive device according to one example embodiment is explained with reference to FIG. 1. The method is repeatedly carried out in cycles in predetermined time intervals. According to the present example embodiment, the bicycle, which is in the form of a pedelec or an e-bike, is operated in an operating mode, in which, when a torque is applied via the crank apparatus, the drive device is operated to assist the muscle-powered operation. When the bicycle rider selects a predetermined operating mode, which is referred to, for example, as an eCruise operating mode, via an input device, the bicycle can be operated in an operating mode, in which the assistance by the drive device can also be provided without muscle power being applied in the form of torque via the pedals onto the crank apparatus. The presence of this mode, which is referred to as an eCruise operating mode, is queried in a step S1. When the presence of the eCruise operating mode is determined in step S1, the rotational speed of the driving wheel is detected in a following step S2. For this purpose, the speed sensor provided at the driving wheel is queried. In the same context, in a step S3, the rotational speed of the crank apparatus is detected. For this purpose, the speed sensor provided at the crank apparatus is queried. In a subsequent step S4, the presence of the synchronous operation with respect to the crank apparatus and the driving wheel is determined. For this purpose, initially, the present transmission ratio between the crank apparatus and the driving wheel is determined by querying the shift state of the transmission. On the basis of the detected transmission ratio between the crank apparatus and the driving wheel, it is therefore determined in step S4 whether the rotational speed of the crank apparatus corresponds to the synchronous speed which is to be present when the driving wheel is driven by the crank apparatus with the present transmission ratio. For the case in which the synchronous speed of the crank apparatus is determined, the presence of the synchronous operation is determined as the result of the step S4. In the present eCruise operating mode, the determination of the drive force at the crank apparatus is not taken into consideration. In other words, the detected value of the drive force which is introduced into the crank apparatus is not taken into consideration. In a subsequent step S5, the specified drive power is queried. For this purpose, a query is carried out to determined which drive power is to be applied for the eCruise operating mode. For the case in which the specified drive power is presently the maximum drive power of the drive device, the maximum drive power is used as the specified drive power. For a deviating case, in which a drive power was determined as the specified drive power that is lower than the maximum drive power, the reduced drive power is used as the specified drive power. Whether the specified drive power is the maximum drive power of the drive device or a reduced drive power, can be specified by the rider using an input device.

In the present example embodiment, in a step S6, the drive device is controlled such that the specified drive power is output by the drive device. In the present embodiment, for this purpose, starting from the present drive power, which may be zero (0) in a starting process, the drive power is increased to the maximum drive power of the drive device via a ramp function. The drive power is therefore increased with a linear function with respect to time. By this approach, the vehicle can be prevented from excessively quickly accelerating due to an abrupt adjustment of the maximum drive power of the drive device, as a result of which excessive slip would arise at the driving wheel. The shape and characteristics, for example, the slope of the ramp of the ramp function or whether the ramp is linear or non-linear, is stored in the controller and, if necessary, can be individualized by the rider via configuration. A non-linear characteristic of the ramp function can have, for example, a tangential start and a tangential end, which is also referred to as an S-shaped curve.

In the present eCruise operating mode, the rider can therefore intuitively hold the rotational speed of the crank at the synchronous speed, such that the freewheel unit provided on the hub of the rear wheel does not presently disengage. In this operating mode, the rider now applies only an extremely small amount of drive force onto the crank apparatus, which drive force is negligible for the propulsion of the vehicle and merely compensates for frictional losses at the transmission device between the crank apparatus and the driving wheel. In this operating mode, the rider can travel with a maximum drive power of the drive device without introducing drive force into the crank apparatus him/herself. For the case in which the rider wants to additionally introduce drive power into the crank apparatus, he/she can do so at any point in time. However, in the present operating mode, a riding style can be achieved, which is particularly gentle for the rider with respect to force and simultaneously provides a high ground speed.

In the present example embodiment, the specified drive force of the drive device is provided when the synchronous speed is present at the crank apparatus. In a modified example embodiment, the specified drive power can be provided by the drive device when the rotational speed of the crank apparatus is slightly lower than the synchronous speed. In this case, the freewheel unit provided on the hub of the rear wheel disengages, such that force is not transmitted between the crank apparatus and the rear wheel. For the step S4 for determining the presence of the synchronous operation, it is provided in this alternative example embodiment that the presence of the synchronous operation is also determined when the rotational speed of the crank apparatus is slightly lower than the synchronous speed of the crank apparatus. In the present example embodiment, this deviation can be set, for example, to five percent (5%), which means that the presence of the synchronous operation is also determined when the rotational speed of the crank apparatus is lower than the synchronous speed by five percent (5%). Other deviations can be readily applied.

In another example embodiment it is provided that, for example, during the starting operation and proceeding from a standstill, propulsion is initially carried out via the crank apparatus. For this purpose, it is provided in the present example embodiment that, when the presence of the eCruise operating mode is determined, the specified drive power is output by the drive device only once the crank apparatus has reached a minimum rotational speed. In this example embodiment, muscle power is used to start off and, once a predetermined rotational speed of the crank apparatus has been reached, the drive force is provided by the drive device. With this example embodiment, it is ensured that, in the presence of the eCruise operating mode even at very low rotational speeds of the crank apparatus, the specified, for example, maximum drive power of the drive device is applied. The minimum rotational speed of the crank apparatus at which, in the presence of the eCruise operating mode, a drive power can be output by the drive device, can be adjusted to a small value of, for example, ten (10) revolutions per minute. Other values are possible, of course, provided that slow travel is also possible without the specified drive force being automatically applied by the drive device. It is also possible to carry out the starting process in the typical pedelec variant, in which the rider's pedal torque is amplified, and to then switch into the above-described eCruise mode. This is advantageous, in particular, when riding uphill.

In the aforementioned exemplary embodiments, the method was applied to a vehicle which is in the form of an e-bike, or a pedelec. The concept is applicable to the same extent on other vehicles, for example, multi-track vehicles having one or more driving wheel(s), provided that the example aspects of the present invention can be achieved. In other exemplary embodiments, an invariable transmission ratio can be provided between the crank apparatus and the driving wheel. In other example embodiments, the front wheel of the vehicle can be drivable with the drive device and the rear wheel can be coupled to the crank apparatus. In other example embodiments, transmission ratios can be adjusted in a stepped or continuous manner using appropriate transmission devices.

Modifications and variations can be made to the embodiments illustrated or described herein without departing from the scope and spirit of the invention as set forth in the appended claims. In the claims, reference characters corresponding to elements recited in the detailed description and the drawings may be recited. Such reference characters are enclosed within parentheses and are provided as an aid for reference to example embodiments described in the detailed description and the drawings. Such reference characters are provided for convenience only and have no effect on the scope of the claims. In particular, such reference characters are not intended to limit the claims to the particular example embodiments described in the detailed description and the drawings.

REFERENCE CHARACTERS

S1 determining operating mode
S2 detecting rotational speed of driving wheel
S3 detecting rotational speed of crank apparatus
S4 determining synchronous operation
S5 querying specified drive power
S6 controlling the drive device

The invention claimed is:

1. A method for open-loop control of a drive device for assisting a vehicle at least intermittently operable by muscle power, the vehicle comprising a driving wheel drivable by drive force from the drive device and a crank apparatus rotatable by a rider of the vehicle, the method comprising:
   (S1) querying presence of a predetermined operating mode of the drive device, the predetermined operating mode specifiable by the rider of the vehicle;
   (S2) detecting a rotational speed of the driving wheel;
   (S3) detecting a rotational speed of the crank apparatus;
   (S4) determining presence of a synchronous operation with respect to the rotational speed of the driving wheel and the rotational speed of the crank apparatus based on a transmission ratio between the crank apparatus and the driving wheel; and (S6) controlling the drive device with a specified drive power regardless of muscle power introduced into the crank apparatus in response to the presence of the predetermined operating mode and the presence of the synchronous operation.

2. The method of claim 1, wherein controlling (S6) the drive device with the specified drive power comprises controlling (S6) the drive device with the specified drive power when the crank apparatus is rotated essentially without force being introduced by the muscle power.

3. The method of claim 1, wherein determining the presence of the synchronous operation comprises determining the presence of the synchronous operation at least when the rotational speed of the crank apparatus corresponds to a synchronous speed resulting from the rotational speed of the driving wheel and the transmission ratio between the crank apparatus and the driving wheel.

4. The method of claim 3, wherein determining the presence of the synchronous operation comprises determining the presence of the synchronous operation when the rotational speed of the crank apparatus is within a speed range from the synchronous speed to a limit speed, wherein the limit speed is less than the synchronous speed.

5. The method of claim 1, wherein, when the drive device is controlled with a specified drive power, the specified drive power is a maximum power that for the drive device or a preset power, wherein the preset power is less than the maximum power for the drive device.

6. The method of claim 1, further comprising, when the drive device is controlled with the specified drive power, adjusting the specified drive power using a predetermined curve.

7. The method of claim 1, wherein controlling (S6) the drive device with the specified drive power comprises controlling (S6) the drive device with the specified drive power when the rotational speed of the crank apparatus corresponds to a predetermined minimum rotational speed.

8. The method of claim 1, wherein controlling (S6) the drive device with the specified drive power comprises controlling (S6) the drive device with the specified drive power when the rotation of the crank apparatus is detected at least during a predetermined minimum time period.

9. A system for controlling a drive device for assisting a vehicle at least intermittently operable by muscle power, the system comprising:

an input interface for receiving signals corresponding at least to a rotational speed of a driving wheel, a rotational speed of a crank apparatus, and a query for presence of a predetermined operating mode of the vehicle;

an output interface for outputting signals for controlling a drive device;

a computer unit for determining a synchronous operation with respect to the rotational speed of the driving wheel and the rotational speed of the crank apparatus, wherein the control device is configured for implementing the method of claim 1.

10. A vehicle comprising the system of claim 9.

11. A system for controlling a drive device for assisting a vehicle at least intermittently operable by muscle power, the system comprising:

an input interface for receiving signals corresponding at least to a rotational speed of a driving wheel, a rotational speed of a crank apparatus, and a query for presence of a predetermined operating mode of the vehicle;

an output interface for outputting signals for controlling a drive device;

a control unit configured for determining a synchronous operation with respect to the rotational speed of the driving wheel and the rotational speed of the crank apparatus, determining presence of a synchronous operation with respect to the rotational speed of the driving wheel and the rotational speed of the crank apparatus based on a transmission ratio between the crank apparatus and the driving wheel, and controlling the drive device with a specified drive power regardless of muscle power introduced into the crank apparatus in response to the presence of the predetermined operating mode and the presence of the synchronous operation.

12. A vehicle, comprising the system of claim 11.

* * * * *